(12) United States Patent
Imai

(10) Patent No.: US 6,349,878 B2
(45) Date of Patent: Feb. 26, 2002

(54) CARD PROCESSING METHOD

(75) Inventor: Eiji Imai, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/234,125

(22) Filed: Jan. 19, 1999

(30) Foreign Application Priority Data

Jan. 19, 1998 (JP) .......................................... 10-008052

(51) Int. Cl.[7] ................................................ G06K 7/00
(52) U.S. Cl. ........................ 235/440; 235/475; 235/487
(58) Field of Search ................................. 235/440, 441, 235/475, 482, 487, 449

(56) References Cited

U.S. PATENT DOCUMENTS

| | | | | |
|---|---|---|---|---|
| 4,833,310 A | * | 5/1989 | Shimamura et al. | .... 235/440 X |
| 5,010,239 A | * | 4/1991 | Mita | ........................... 235/441 |
| 5,036,184 A | * | 7/1991 | Sasaki | ......................... 235/479 |
| 5,196,687 A | * | 3/1993 | Sugino et al. | .......... 235/441 X |
| 5,559,317 A | * | 9/1996 | Wong et al. | ................. 235/449 |
| 5,932,869 A | * | 8/1999 | Gottlich et al. | ......... 235/449 X |

\* cited by examiner

*Primary Examiner*—Karl D. Frech
(74) *Attorney, Agent, or Firm*—Sughrue Mion, PLLC

(57) ABSTRACT

A card processing method for a card reader into and from which a magnetic/IC card is manually inserted and pulled through a card insertion slit, and which includes a magnetic head and an IC contact block for reading and storing data from and into the card for data processing, including the steps of: inserting the card into the card reader and pulling out the card from the card reader; selecting a process for magnetic data by the magnetic head or a process for IC data by the IC contact block; and discharging the card from the card reader immediately after the card is inserted into the card reader irrespective of the kind of data process.

10 Claims, 4 Drawing Sheets

CARD PROCESSING METHOD

BACKGROUND OF THE INVENTION

1. Field of the Invention

The present invention relates to a card processing method used for a manual card reader for processing a magnetic/IC card.

2. Related art

A card reader which records or stores data into and reads data out of a card-like data storing medium is known. Various types of card readers are used; some types of card readers are based on a manual operation for card insertion, and some types of card readers are driven by the motor for card insertion.

To prevent the user from leaving his magnetic card, the manual type card readers of widespread use are each designed such that a magnetic card is forcibly inserted into the card reader by manual force, and pulled out of the card reader also by manual force, and thereafter the card reader starts to execute its transaction process (data process). In operation, the manual card reader reads transaction information out of a magnetic stripe zone of the magnetic card by use of its magnetic head when the card is inserted into or pulled out of the card reader, and executes a transaction process using the readout information after the magnetic card is discharged.

On the other hand, IC-chip contained cards such that the IC card with an IC chip buried therein or the magnetic/IC card with an IC chip and a magnetic stripe zone increase their shares in the market. For carrying out a data process (IC process) by the card reader for those IC-chip contained cards, the IC communication block of the card reader is brought into contact with or approached to the IC terminal of the card. In carrying out a data process, the card is set immovable when data is stored into or read out of the card. For this reason, the manual IC card reader carries out the transaction process in a state that the card is left in the card reader. In particular, the manual card reader for handling the magnetic/IC card carries out the transaction process after it receives the card and ejects the same therefrom when it is operated in a magnetic card mode, and performs the same process in a state that the card is fixed when it is operated in an IC card mode. Thus, the card reader is operated in either of two operation modes.

The manual card reader for handling the magnetic cards has widely been used. Because of this, the card users have been accustomed to the handling of the card reader for the magnetic cards. For this reason, when the user utilizes the IC card function of the magnetic/IC card or uses the IC card, the user is likely to mistakenly operate the card reader designed for the IC and magnetic/IC cards; he inserts the card into the card reader and then pulls it out of the same immediately after the insertion. Particularly when utilizing the IC card function of the magnetic/IC card, he tends to mistakenly perform the procedural operations of inserting and pulling out the card. In this case, the mistaken operation by the user hinders a quick operation of the card reader for its IC transaction.

When the card reader designed for handling the magnetic/IC card or the IC card is loaded into the card reader, the IC communication block is brought into contact with or approached to the IC terminal of the card. To secure this state, a lock mechanism is assembled into the card reader to prevent the user from pulling the card out of the card reader during the data communication. In a case where the card reader provided with the lock mechanism is used, if the user pulls the card out of the card reader immediately after being inserted into the same, the pulling out operation and the locking operation by the lock mechanism concurrently progress, possibly malfunctioning the lock mechanism of the card reader. This unwanted situation frequently occurs particularly in the use of the manual card reader handling the magnetic/IC card since it needs two different card processings, i.e., a card processing for the magnetic card and another card processing for the IC card.

SUMMARY OF THE INVENTION

Accordingly, an object of the present invention is to provide a card processing method for a manual card reader handling the IC-chip contained cards, particularly magnetic/IC cards, which the method eliminates its different operations, one for the magnetic card function and the other for the IC card function, and further eliminates the malfunction of the lock mechanism for pull-out prevention and the damaging of the card.

According to an aspect of the present invention, there is provided a card processing method for a card reader into and from which a magnetic/IC card is manually inserted and pulled through a card insertion slit, and which includes a magnetic head and an IC contact block for reading and storing data from and into said card for data processing, said method comprising the steps of:

inserting said card, by manual, into said card reader through said card insertion slit;

discharging said card, by manual, from said card reader;

receiving a select signal to select one of a process for magnetic data by said magnetic head and a process for IC data by said IC contact block; and carrying said data process specified by said select signal.

According to another aspect of the present invention, a card processing method for a card reader into which a magnetic/IC card is manually inserted, and which includes an IC contact block for reading and storing data from and into said card through said IC contact block in a state that said card is inserted to the deepest position while a part of said card is left outside said card reader, said method comprising the steps of:

inserting said card into the deepest position within said card reader through said card insertion slit;

discharging said card from said card reader by manual;

re-inserting said card up to said deepest position within said card reader through said card insertion slit when a data processing is carried out between an IC contained in said card and said IC contact block;

carrying out said data processing between said IC contained in said card and said IC contact block by bringing said IC contact block into contact with said predetermined position on said card; and discharging again said card from said card reader.

As seen from the foregoing description, in the card processing method of the invention, after the card is inserted into the card reader through the card insertion slit and discharged therefrom, the magnetic data process by the magnetic head or the IC data by the IC contact block is selected. Therefore, the card insertion operation and the card discharging operation are successively carried out, and the card insertion/discharging procedure may be used common to both the magnetic data process and the IC data process. This lessens a chance of mistaken operation by the user.

For the IC data process, the card is re-inserted into the card reader through the card insertion slit, to thereby bring the IC contact of the IC contact block into contact with a predetermined position on the card. Therefore, the user recognizes anew that the IC data process is to be performed. This also lessens a chance of mistaken operation by the user.

DETAILED DESCRIPTION OF THE PREFERRED EMBODIMENTS

The preferred embodiment of the present invention will be described in detail with reference to the accompanying drawings.

Figure 1:
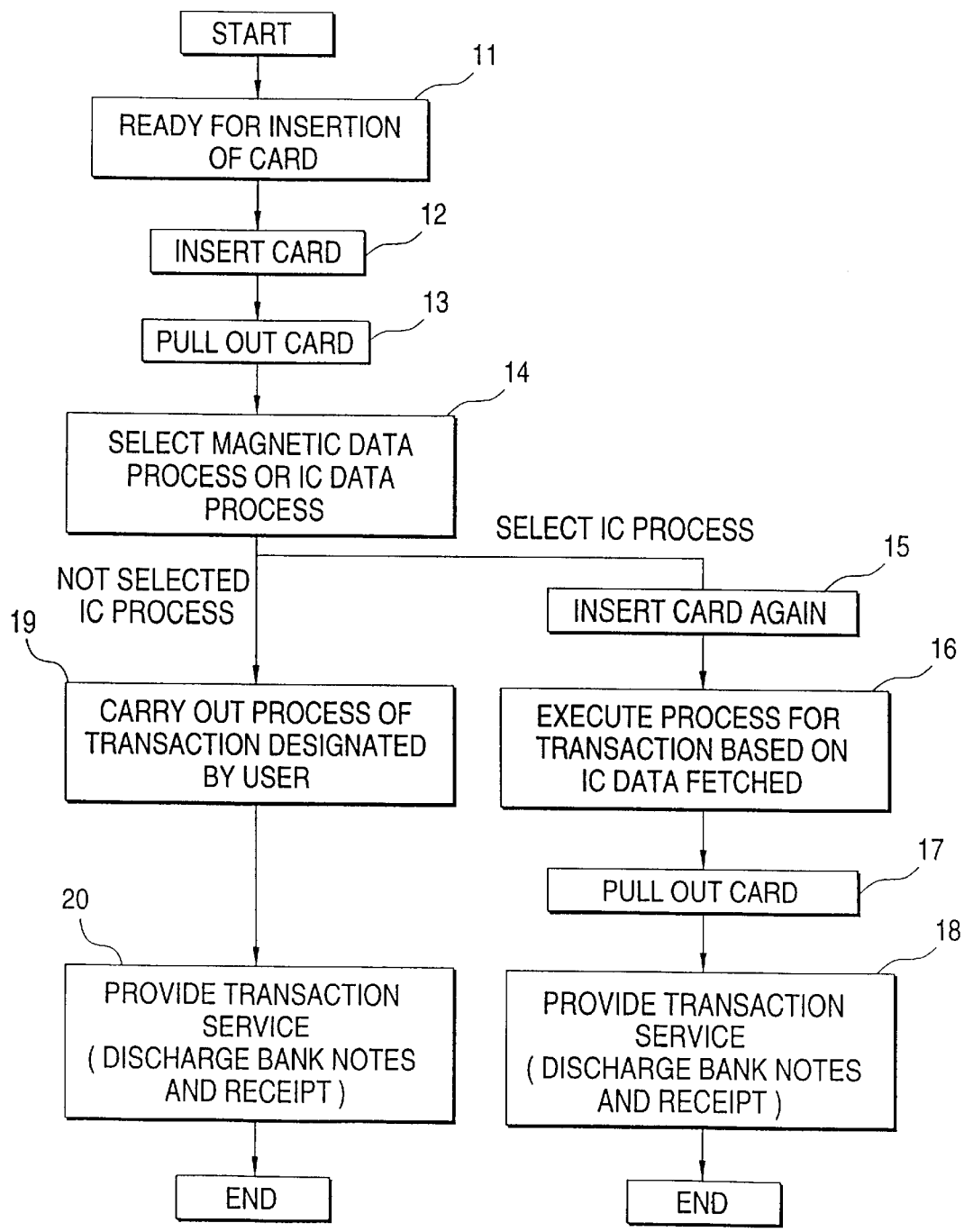
FIG. 1 is a flow chart showing a process flow of a card processing method constructed according to the present invention.
Figure 2:
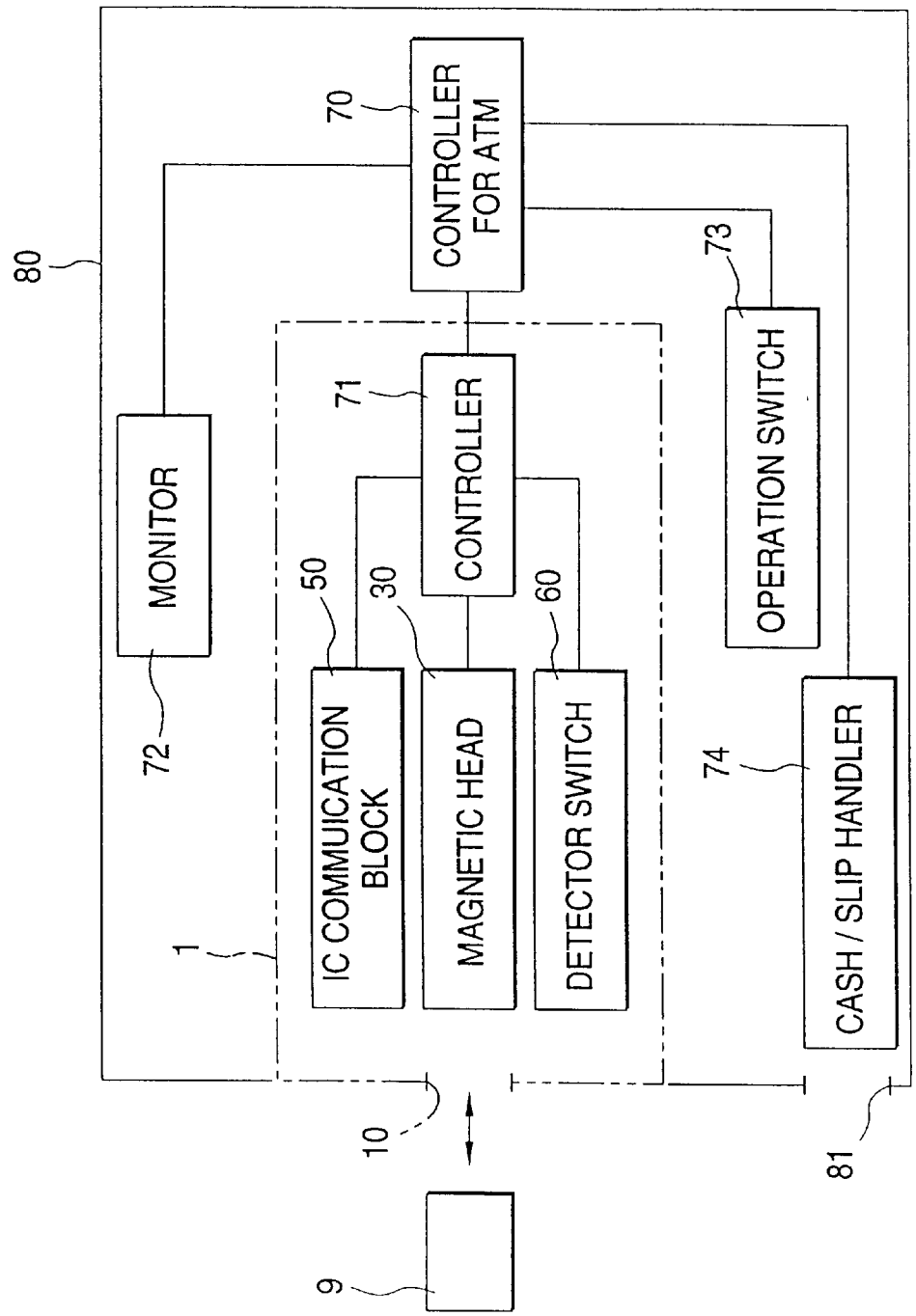
FIG. 2 is a block diagram showing an arrangement of a card reader for executing the card processing method shown in FIG. 1.

FIG. 1 is a flow chart showing a process flow of a card processing method which is an embodiment of the present invention. FIG. 2 is a block diagram showing an automatic teller machine (ATM) 80 with a card reader for executing the card processing method as shown in FIG. 1. In FIG. 2, a card reader 1 of the manual type is contained in the ATM 80. The card reader 1 is capable of handling a magnetic/IC card (referred to frequently as a card) having a magnetic card function and an IC card function. The card reader 1 contains a magnetic head 30 for storing data to and reading data out of a stripe zone of the card 9, an IC communication or contact block 50 of the contact type (referred to as an IC contact block) through which data communication is performed between the card reader and an IC of the card 9, a detector switch 60 for detecting the insertion of the card 9 into the card reader, and a controller 71. The card 9 is manually inserted into the card reader 1 through a card insertion or entrance slit 10. When the card 9 is fully inserted into the card reader 1, a part of the card 9 is left outside the card reader 1. To pull the card 9 out of the card reader 1, the user picks up this part of the card 9 between his fingers and pulls it out to his side.

The controller 71 of the card reader 1 is connected to the IC contact block 50, the magnetic head 30, and the detector switch 60. The detector switch 60 is disposed in the vicinity of the card insertion slit 10 of the card reader 1, more specifically closer to the card insertion slit 10 than the magnetic head 30. The controller 71 is connected to a controller 70 for controlling the operations of the overall ATM 80. The controller 70 is connected to a monitor 72, an operation switch 73, and a cash/slip handler 74. Incidentally, the monitor 72 visually presents operation instructions to the card user. An exit slit 81, which is further contained in the ATM 80, discharges bank notes and slips.

With the movement of the card 9 inserted, the IC contact block 50 moves from a card separation position, so that an IC contact of the IC contact block 50 is brought into contact with an IC terminal located at a given position of the card 9 and the card 9 is moved to a card contact position. When the card 9 is pulled out of the card reader 1, the IC contact block 50 is moved apart from the card 9 by a proper drive means, e.g., a return spring or a motor, and returned or retracted to a stand-by position.

The card processing method of the invention will be described with reference to FIG. 1.

In a step 11, the card reader 1 is ready for the insertion of a card 9, viz., in a stand-by mode. The user inserts a card 9 into the card reader 1 being in this mode, through the card insertion slit 10, and pulls it out of the card reader 1. In other words, the card reader 1 performs a card insertion operation (step 12) permitting the insertion of the card 9 thereinto, and a card discharging operation (step 13) permitting the pulling-out of the card 9 immediately after the card insertion operation. It is noted that the card processing method, unlike the conventional one, inhibits the lock mechanism of the card reader 1 from operating for the first card insertion (steps 12 and 13). Therefore, the card 9 may be smoothly inserted and discharged. In this case, with the insertion and discharging of the card 9, the IC contact block 50 is moved from the stand-by position to the contact position, and smoothly returned to the stand-by position.

There is a case where the user forgets to pull his card out of the card reader 1. A preferable measure for coping with this is that the user leaves his card in the card reader 1 and a state of the card being left continues for a predetermined time, the controller 71, in the step 13, causes the monitor 72 to display an instruction to pull out the card or an alarm instruction to insert or discharge the card again.

The insertion, or the first insertion, of the card 9 (step 12) is detected by the detector switch 60 provided near the card insertion slit 10. A detection signal derived from the detector switch 60 drives the magnetic head 30 to read out magnetic data from the card 9 in the first insertion operation (step 12) or the discharging operation (step 13). Incidentally, the magnetic head 30 is provided in the card path in a state that it may come in contact with the magnetic stripe zone of the card. After discharging the card 9 (step 13), the controller asks the user to select which of the processing modes, an IC card processing mode or a magnetic card processing mode, viz., displays a message requesting the user to select a related button designating a desired processing mode on the monitor 72 that is located in the operation panel, and waits till the operator depresses his desired button (step 14). Thus, after the card 9 is inserted into the card reader 1 through the card insertion slit 10 and then is discharged, the controller requests the user to select a magnetic data process by the magnetic head 30 or an IC data process by the IC contact block 50 (step 14). In other words, in the step 14 following the card insertion and discharging operations, the controller generates a select signal to select a process of magnetic data fetched through the magnetic head 30 or a process of IC data fetched through the IC contact block 50, and sends the select signal to the controller 70 for the ATM 80.

The user sees the display by the monitor 72 and depresses a select button (contained in the operation switch 73) to select the IC data process or another select button to select the magnetic data process. In this case, he selects the former switch. Then, the controller 70 receives a select signal to select the process of IC data read in through the IC contact block 50, and displays an instruction to insert the card 9 again on the monitor 72 (step 15). Responding to the re-insertion of the card 9, the IC contact block 50 is moved to the contact position along the card traveling path, and the IC contact of the IC contact block 50 is brought into contact with the related position of the card 9, with progress of the re-insertion of the card 9 through the card insertion slit 10. Subsequently, a process for transaction based on the data fetched from the IC card is executed (step 16). Specifically, the read-out and writing of data from and to the IC card are performed.

After the read/write operation of the IC data ends, the card 9 is pulled out (step 17). With the discharging operation of the card, the IC contact block 50 moves to the stand-by position, and the bank note or notes and a slip, e.g., receipt, are discharged to the user, through the exit slit 81 of the ATM 80 (step 18).

Then, it is assumed that the user depresses a select button to select the magnetic data process; a select signal to select the same process is generated and received (step 14). Then, the controller advances to a step 19. In this step 19, a process of the transaction designated by the user through the operation switch 73 is carried out. As recalled, the magnetic data is read out from the card at the time of the first card insertion operation (step 12) or the card discharging operation (step 13). Therefore, the card transaction process using the read out data is carried out subsequently. In case where data needs to be stored into the card 9 by use of the magnetic head 30, an instruction to store data into the card is displayed on the monitor 72, and the user sees the instruction and inserts the card again into the card reader. The data is written into the card at the time of the card insertion operation or the card discharging operation.

After the card transaction process ends, the ATM 80 supplies bank notes together with the related slip as instructed, through the exit slit 81 (step 20). Here, the card transaction service ends, and the ATM 80 waits for the next card insertion, viz., the controller of the card reader returns to the step 11.

As described above, the card processing method of the invention uses the sequence of card insertion and discharging operations (steps 12 and 13) irrespective of the type of data process, the IC data process or the magnetic data process; the card 9 is first inserted fully, and pulled out immediately after the insertion irrespective of the type of data process. In other words, the card processing method enables the card operation procedure (including insertion and discharging operations) to be common in use to both the magnetic card and the IC card. Further, when the user desires to use the IC card function, the card reader instructs the user to re-insert the card 9 (step 15). By the instruction, the user recognizes anew that the IC card transaction is to be performed. This feature greatly contributes to lessen a chance that the user mistakenly pulls out the card 9 from the card reader. Furthermore, to receive a service by the IC card function (step 18), the user must pull again the card out of the card reader (step 17). The feature reliably prevents the user from leaving the card in the ATM or card reader.

Figure 3:
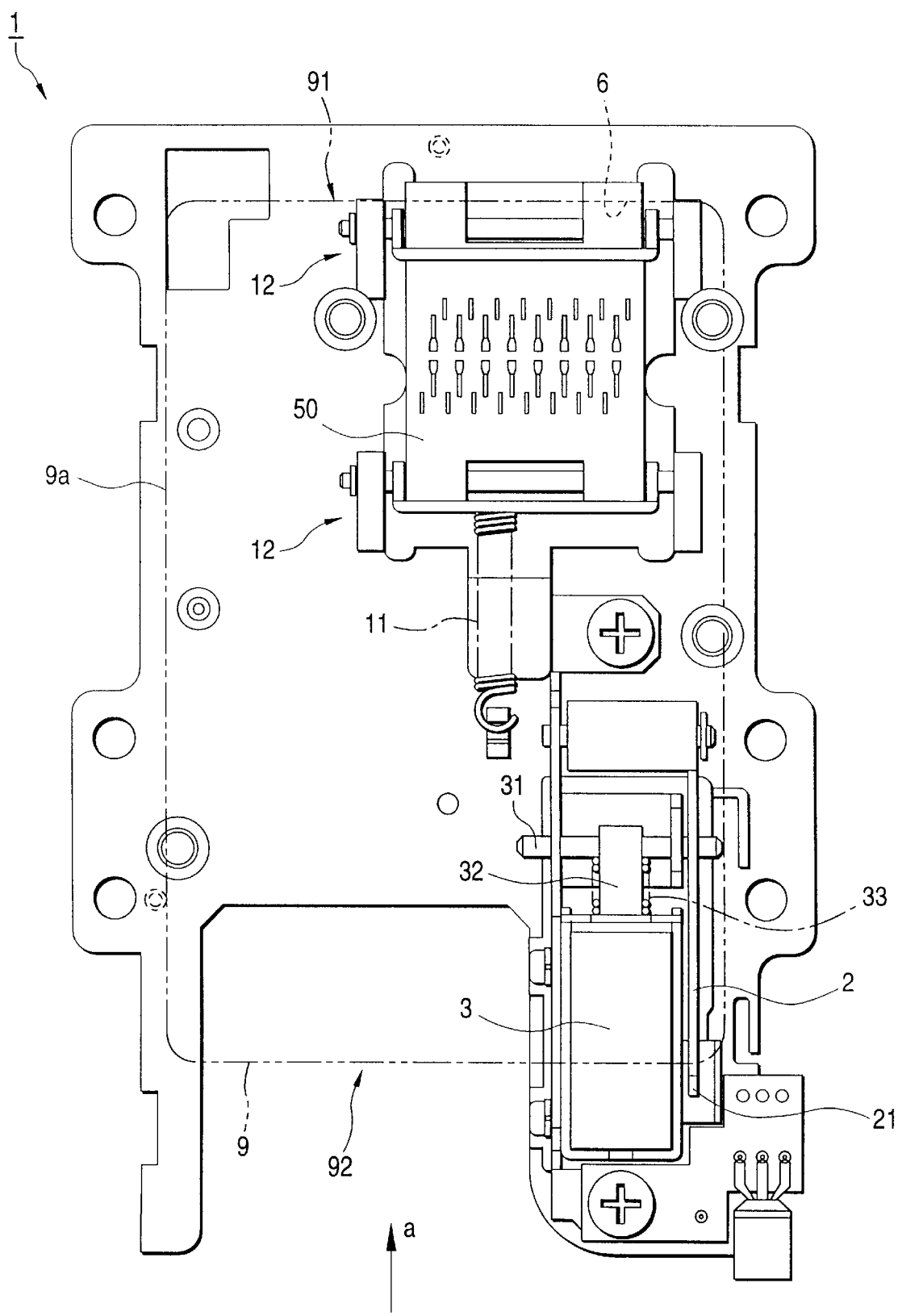
FIG. 3 is a plan view showing a manual card reader capable of executing the card processing method.

A manual card reader that can execute the card processing method of the present invention will be described in detail with reference to FIGS. 3 and 4.

As shown, the card reader 1 is provided with a card lock member 2 that is moved by a solenoid 3. When the inserted card 9 is located at a card-insertion end position 9a, it is locked by a lock portion 21 of the card lock member 2. When the card is located at this position, a part of the card is located outside. To pull the card out of the image reader, the user picks up this part of the card between his fingers and pulls the card to this side.

Figure 4:
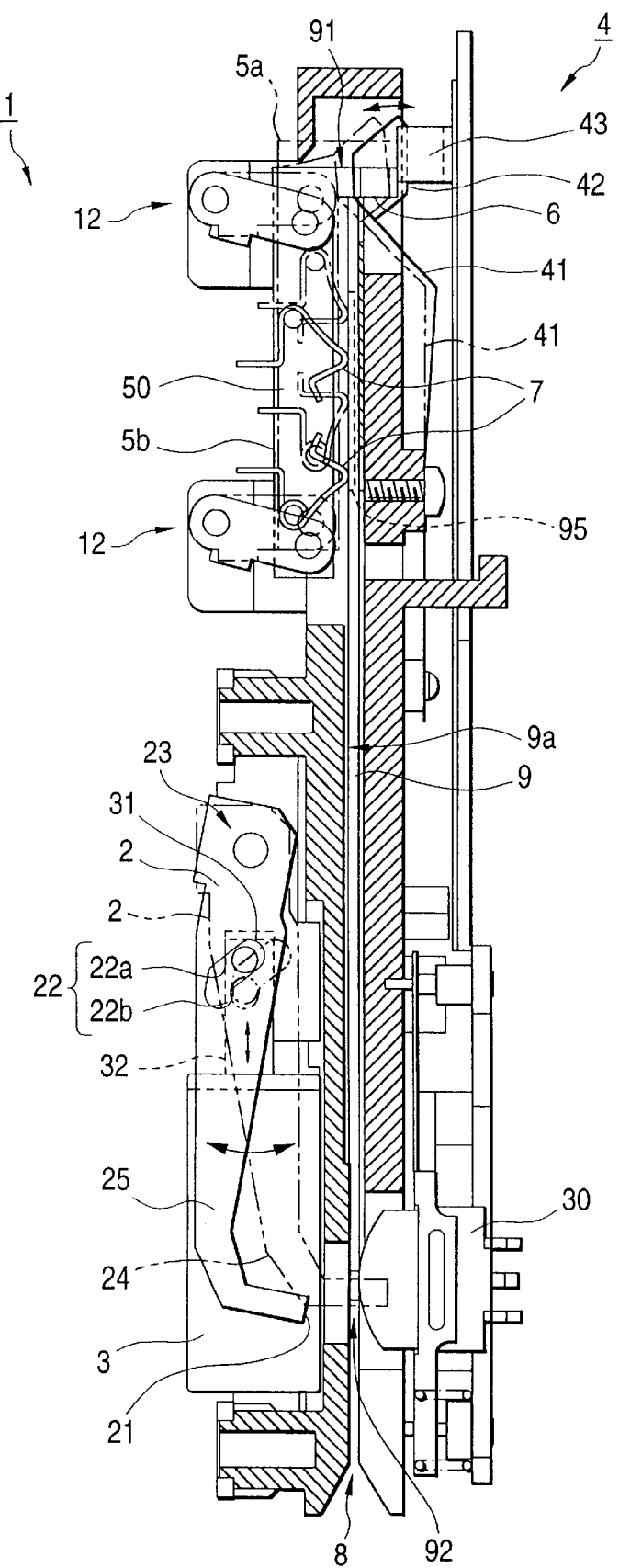
FIG. 4 is a side view showing the manual card reader of FIG. 3.

As shown in FIG. 4, the card lock member 2 may be turned within a limited angular range between a lock position 24 and a non-lock position 25, about a fulcrum 23 with respect to the frame of the card reader 1. To lock the card 9, the lock portion 21 of the card lock member 2 is brought into contact with the base end 92 of the card 9 to thereby lock the card. At the lock position 24, the lock portion 21 is located in the card travelling path 8 to block the movement of the card for its discharging.

An engaging hole 22 is located between the lock portion 21 and the fulcrum 23 as the center of swing of the card lock member 2. An engaging pin 31, which is provided at the tip of a plunger 32 of the solenoid 3, is inserted into the engaging hole 22, whereby the card lock member 2 is movable in linking with the solenoid 3. The engaging hole 22 consists of a movement hole 22a slanted with respect to the axis of the plunger 32 and a hold hole 22b substantially parallel to the same axis. Those holes are smooth and continuous.

When the plunger 32 is pulled into the solenoid 3 from a slid line position (FIG. 4), the engaging pin 31 slides along the edge of the movement hole 22a, and the card lock member 2 is turned toward the lock position 24. When the engaging pin 31 is located into the hold hole 22b, the card lock member 2 is held immovable in the angular direction in a state that card lock member 2 is fixed at the lock position 24. When the plunger 32 is moved apart from the solenoid 3, the card lock member 2 is released from its locked state and turned to the non-lock position 25. Thus, the engaging hole 22 properly guides the card lock member 2 with the movement of the solenoid 3.

A return coiled spring 33 is coupled to the plunger 32 of the solenoid 3, which turns the card lock member 2 between the lock position 24 and the non-lock position 25. The return coiled spring 33 constantly urges the plunger 32 in the direction in which the plunger 32 is displaced out of the solenoid. When no current is fed to the coil of the solenoid 3 (it is in an off state), the plunger 32 is protruded from the return coiled spring 33. When current is fed to the solenoid 3 (it is in an on state), the plunger 32 is pulled into the solenoid 3 electromagnetically. When the solenoid 3 is placed in an on state (energized), the card lock member 2 is turned up to the lock position 24 and its state is maintained. When it is placed in an off state (deenergized), the card lock member 2 is returned to the non-lock position 25.

A detection switch 4 is provided as a means to detect the insertion of the card 9 into the card reader 1 and to drive the solenoid 3. The detection switch 4 is located so as to detect that the card 9 reaches the card-insertion end position 9a as the deepest position of the card reader, not located at a position close to the card insertion slit.

Specifically, the detection switch 4 consists of the combination of a sensor spring 41 and a photo interrupter 43 (FIG. 4). A part of the sensor spring 41 is located in the card travelling path 8. The moving card 9 comes in contact with the part of the sensor spring 41 and pushes it down. A shield plate 42 is firmly attached to the end of the sensor spring 41. When the sensor spring 41 is pushed down, the shield plate 42 covers the photo interrupter 43 to shut off light to the photo interrupter 43. The insertion of the card is detected through the shutting off of light to the photo interrupter 43 by the shield plate 42. While the detection switch 4 is of the optical type in the embodiment, it may be of the mechanical type, e.g., a microswitch.

The card reader 1 includes a card contact portion 6 with which the leading edge 91 of the card 9 contacts, an elastic contact 7 to be in contact with the IC terminal, or a contact terminal pattern 95, of the card 9, and an IC contact block 50 which obliquely moves with the insertion of the card 9, and reaches a contact position 5a at the end of the card insertion. The IC contact block 50, as shown in FIG. 4, is provided on the frame of the card reader 1 such that it is obliquely moved by a parallel link mechanism 12 while being parallel to the card travelling path 8.

The card lock member 2 is formed with two links having the same configuration (FIG. 4), and causes a parallel movement of the IC contact block 50 when it is turned. The IC contact block 50 is obliquely moved on an arc as shown. Therefore, it varies its distance to the card travelling path 8 while moving in parallel to bring its contact 7 into contact with the contact terminal pattern 95 of the card 9 or separate it from the latter. The IC contact block 50 is urged, by an urging means 11, in the direction opposite to the direction a of an arrow (FIG. 4), i.e., toward the leading edge 91. Therefore, when the card 9 is not inserted, it is placed at a non-contact position 5*b* indicated by a solid line in FIG. 4.

On the right side of the IC contact block 50 in the drawing, the card contact portion 6 is projected across the card travelling path 8. When the card contact portion 6 comes in contact with the leading edge 91 of the moving card 9, it is pushed in the direction a to move the IC contact block 50 in parallel fashion.

The contact 7 is provided on one side of the IC contact block 50. When it is brought into contact with the card 9, a path for data communication is setup. Specifically, a coiled steel wire, for example, is located within the IC contact block 50 as shown. One end of the steel wire may be turned within a limited angular range. A curved portion of the coiled steel wire is projected from one side of the IC contact block 50 so as to come in contact with t the contact terminal pattern 95 of the card 9. As for the contact 7, an elastic force of a copper wire is utilized as a pressing force to the card 9. The contact 7 is disposed at such a position as to face the contact terminal pattern 95 of the card 9 when the leading edge 91 of the card 9 comes in contact with the card contact portion 6 of the IC contact block 50. When the card 9 is further inserted from this position, the IC contact block 50 moves in the direction a a distance equivalent to the insertion movement of the card 9. Therefore, the contact 7 moves to and comes in contact with the contact terminal pattern 95. In this case, the contact 7 is brought into contact with the contact terminal pattern 95 before the card 9 reaches the card-insertion end position 9*a*, as a matter of course. Then, the contact 7 approaches to the card 9 and comes in contact with the same. At this time, it is pressed against the contact terminal pattern 95 by the utilization of the elasticity of the contact 7 per se, and hence a contact state of them is reliable and stable.

In the thus constructed card reader 1, since the card 9 is locked by operating the solenoid 3, the feeding of current to the solenoid 3 only when the data communication is performed suffices. Therefore, by feeding current to the solenoid 3 when the card 9 is inserted into the solenoid 3, the card 9 is automatically locked. In the IC card process requiring the locking of the card by the card lock member, the user recognizes anew the IC card process to be performed by re-inserting the card into the card reader.

Accordingly, there is less chance that the user mistakenly pulls the card out of the card reader when the locking of the card progresses, and hence that the card lock member is damaged. The same effect can be achieved if the card lock member is not used since the user recognizes again that the IC card process is to be performed.

While the present invention has specifically been described, it should be understood that the invention may variously be modified, changed and altered within the true spirits of the invention. In the above-mentioned embodiment, magnetic data is read out by the magnetic head 30 at the time of either the first card insertion (step 12) or the card discharging. When the card detector switch 60 is located near the card insertion slit, it is preferable to read out data at the time of card insertion by the magnetic head 30. When it is located so as to detect the card insertion when the card 9 reaches the card-insertion end position as the deepest position, it is preferable that data is read out at the time of card discharging. If required, data may be read out at the time of both the card insertion and the card discharging. In this case, a read error is reduced in occurrence.

When the card 9 is re-inserted (step 15), the magnetic data may be read out again. There is a chance that another card is inserted in the step 15. Whether or not the re-inserted card is correct can be judged by comparing the magnetic data read out in the step 12 or 13 with that read out in the step 15. Alternatively, it may be judged by comparing the magnetic data read out in the step 12 or 13 with the IC data. By so doing, occurrence of read error is lessened.

As seen from the foregoing description, in the card processing method of the invention, after the card is inserted into the card reader through the card insertion slit and discharged therefrom, the magnetic data process by the magnetic head or the IC data by the IC contact block is selected. Therefore, the card insertion operation and the card discharging operation are successively carried out, and the card insertion/discharging procedure may be used common to both the magnetic data process and the IC data process. This lessens a chance of mistaken operation by the user.

For the IC data process, the card is re-inserted into the card reader through the card insertion slit, to thereby bring the IC contact of the IC contact block into contact with a predetermined position on the card. Therefore, the user recognizes anew that the IC data process is to be performed. This also lessens a chance of mistaken operation by the user.

What is claimed is:

1. A card processing method for a card reader into and from which a magnetic/IC card is manually inserted and pulled through a card insertion slit, and which includes a magnetic head and an IC contact block for reading and storing data from and into said card for data processing, said method comprising the steps of:

inserting said card, manually, into said card reader through said card insertion slit, followed by;

discharging said card, manually, from said card reader, followed by;

receiving a select signal to select one of a process for magnetic data by said magnetic head and a process for IC data by said IC contact block; and carrying out said data process specified by said select signal.

2. A card processing method according to claim 1, further comprising the steps of:

inserting said card into said card reader through said card insertion slit when a select signal indicative of the IC data process is received;

bringing said IC contact block into contact with a predetermined position on said card;

carrying out data processing between said card and IC contact block; and discharging again said card out of said card reader.

3. A card processing method according to claim 2, wherein said card reader includes a detection switch for detecting the insertion of said card, and method further comprising the steps of:

detecting a first insertion of said card by said detection switch; and reading out magnetic data by said magnetic head at one of the time of the first card insertion and a card discharging following the first card insertion by operating said magnetic head in response to the detection of the first card insertion.

4. A card processing method according to claim 3, further comprising the steps of:

carrying out a processing in use of the magnetic data read by said magnetic head at one of the time of the first card insertion and a card discharging following the first card insertion when a select signal to select the magnetic data process is received.

5. A card processing method according to claim 2, wherein said card reader includes a card lock member for locking said card in said card reader in a state that said IC contact block is brought into contact with a predetermined position on said card, said method further comprising the steps of:

locking said card by said locking member when said card is re-inserted into said card reader through said card insertion slit and said IC contact block is brought into contact with said predetermined position.

6. A card processing method for a card reader into which a magnetic/IC card is manually inserted, and which includes an IC contact block for reading and storing data from and into said card through said IC contact block in a state that said card is inserted to the deepest position while a part of said card is left outside said card reader, said method comprising the steps of:

inserting said card into the deepest position within said card reader through said card insertion slit, followed by;

discharging said card, manually, from said card reader, followed by;

receiving a select signal to select one of a process for magnetic data by a magnetic head and a process for IC data by said IC contact block;

re-inserting said card up to said deepest position within said card reader through said card insertion slit when a data processing is carried out between an IC contained in said card and said IC contact block;

carrying out said data processing between said IC contained in said card and said IC contact block by bringing said IC contact block into contact with said predetermined position on said card; and discharging again said card from said card reader.

7. A card processing method according to claim 6, wherein said card reader includes a card lock member for locking said card in said card reader, said method comprising the steps of;

locking said card by said card lock member when a data processing is carried out between an IC contained in said card and said IC contact block.

8. A card processing method according to claim 7, wherein said card reader includes a detection switch for detecting the insertion of said card and a magnetic head for reading and storing magnetic data from and into said card, said method further comprising the steps of:

detecting a first insertion of said card by said detection switch; and reading out the magnetic data by said magnetic head at one of the time of the first card insertion and a card discharging following the first card insertion by operating said magnetic head.

9. A card processing method according to claim 8, further comprising the steps of:

carrying out a data processing in use of the magnetic data read by said magnetic head at one of the time of the first card insertion and a card discharging following the first card insertion when said data processing in use of the magnetic data is selected.

10. A card processing method for a card reader into and from which a magnetic/IC card is manually inserted and pulled through a card insertion slit, and which includes a magnetic head and an IC contact block for reading and storing data from and into said card for data processing, said method comprising the steps of:

inserting said card, manually, into said card reader through said card insertion slit;

discharging said card, manually, from said card reader;

receiving a select signal so that a user manually selects one of a process for magnetic data by said magnetic head and a process for IC data by said IC contact block; and carrying out said data process specified by said select signal.

* * * * *